United States Patent [19]

Johnson et al.

[11] Patent Number: 5,077,323

[45] Date of Patent: Dec. 31, 1991

[54] METHOD TO IMPROVE FLOWABILITY OF ALKALINE PHENOLIC RESIN COATED SAND

[75] Inventors: Calvin K. Johnson, Lockport; Richard C. Cooke, Jr., North Riverside; David R. Armbruster, Forest Park, all of Ill.

[73] Assignee: Acme Resin Corporation, Westchester, Ill.

[21] Appl. No.: 418,546

[22] Filed: Oct. 10, 1989

[51] Int. Cl.$^5$ ............................................. C08J 61/10
[52] U.S. Cl. ................................ 523/145; 523/146; 523/147
[58] Field of Search ........................................ 523/145

[56] References Cited

U.S. PATENT DOCUMENTS

| Re. 32,720 | 7/1988 | Lemon et al. | |
|---|---|---|---|
| 4,196,114 | 4/1980 | Funabiki | 523/145 |
| 4,452,927 | 6/1984 | Matsushima et al. | |
| 4,460,716 | 7/1984 | Saeki | 523/145 |
| 4,468,486 | 8/1984 | Matsushima | 523/145 |
| 4,546,124 | 11/1984 | Laitar et al. | |
| 4,590,229 | 5/1986 | Gardikes | 523/145 |
| 4,766,949 | 8/1988 | Jhaveri | 523/145 |
| 4,780,489 | 10/1988 | Dunnavant et al. | 523/145 |
| 4,848,443 | 7/1989 | Westwood et al. | 523/145 |

FOREIGN PATENT DOCUMENTS

| 53-130224 | 11/1978 | Japan . |
| 54-136524 | 10/1979 | Japan . |
| 582882 | 12/1977 | U.S.S.R. . |
| 1579521 | 11/1980 | United Kingdom . |

Primary Examiner—Paul R. Michl
Assistant Examiner—Edward J. Cain
Attorney, Agent, or Firm—Rockey and Rifkin

[57] ABSTRACT

A process for improving the flowability of resin coated sand which comprises the use of a flow promoter with the mixture of sand and resin. Also provided is a foundry mix comprising foundry sand, a resin binder and the flow promoter, as well as a process for making foundry cores and molds using the foundry mix. The resins are ester-curable alkaline phenolic resole resins. The flow promoter is selected from the group consisting of fatty acids, fatty alcohols, fatty amines, fatty amides and fatty alkanolamides.

14 Claims, No Drawings

METHOD TO IMPROVE FLOWABILITY OF ALKALINE PHENOLIC RESIN COATED SAND

FIELD OF THE INVENTION

This invention relates to resin binders useful for making foundry sand cores and molds and to a method for improving the flowability of sands coated with the resins.

BACKGROUND OF THE INVENTION

Binders or binder systems for foundry cores and molds are well-known. In the foundry art, cores or molds for making metal castings are normally prepared from a mixture of an aggregate material, such as sand, and a binding amount of a binder or binder system. Typically, after the aggregate material and binder have been mixed, the resulting mixture is rammed, blown or otherwise formed to the desired shape or pattern, and then cured with the use of catalysts and/or heat to a solid, cured state.

A variety of different processes for forming molds and cores have been developed in the foundry industry. One type of process known as the "hot-box" process requires that the mixture of aggregate material and binder be cured and hardened in a holding pattern or core box while subjected to heat. Another type of binder system which does not require heating in order to bring about curing or hardening is known as a "no-bake" process. A third type of process used for forming molds or cores is known as the "cold-box" process. Cold-box processes are generally carried out by passing gaseous catalysts or hardeners through molded resin-coated sand at ambient temperatures in order to achieve curing.

One such "cold-box" process employs an aqueous alkaline solution of a phenolic resole resin as the binder. This binder is cured by passing the volatile ester through the molded resin-coated material. The process is described in detail in U.S. Pat. No. 4,468,359 (Re. 32,720).

The ester cured process is superior to some of the earlier processes from an environmental standpoint. However, sands coated with alkaline phenolic resole resins tend to have less flowability than sands coated with certain other binder systems. This can adversely affect quality of the foundry cores and molds. In the case of this cold-box process, higher blow pressures are needed to blow the coated sand into the core boxes and it is more difficult to blow uniformly dense cores.

Now it has been found, in accordance with this invention, that when certain compounds are used with the ester-curable alkaline phenolic resole resin binders, they improve greatly the flowability of sands coated with the binders. These sands form cores and molds with smoother surfaces and sharper edges, as well as with more uniform density. Such cores and molds give castings of better quality. This improvement also makes possible the production of cores and molds with more delicate patterns. Furthermore, when the resin coated sands of this invention are blown into core boxes, they can be blown at lower pressures resulting in less pattern wear and in less sand being blown out of the vents. In addition, the cores prepared from these sands are released more readily from the core boxes.

SUMMARY OF THE INVENTION

In accordance with this invention, there is provided a process for improving the flowability of sand coated with an ester-curable alkaline phenolic resole resin binder. This comprises incorporating into the mixture of sand and resin binder an amount of a flow promoter effective to improve the flowability of the coated sand wherein the flow promoter comprises one or more compounds having the structural formula: A-Y where A is a hydrocarbon radical containing from about 10 to about 20 carbon atoms and Y is selected from the group consisting of —OH, —COOH, —OZ, —NR$_2$, and —CONR$_2$ where the Rs are the same or different and denote H, alkyl groups containing from 1 to 3 carbon atoms, or Z, where Z denotes —(CHX—CHX—O)$_n$H wherein X denotes H or CH$_3$ and n is a whole number from 1 to 5.

Further provided in accordance with this invention is a foundry mix for preparing foundry cores and molds which comprises a foundry sand, from about 0.5 percent to about 8 percent by weight of the sand of an ester-curable alkaline phenolic resole resin binder and an amount of a flow promoter effective to improve the flowability of the mix.

Also provided, in accordance with this invention, is a process for production of foundry cores and molds which comprises preparing the foundry mix of this invention, placing the foundry mix in a vented core or mold box and gassing the mixture in the core or mold box with a volatile ester.

DESCRIPTION OF THE PREFERRED EMBODIMENTS

The process of this invention is used with ester-cured alkaline phenolic resole resin binders in the cold-box process. When ester-cured alkaline phenolic resole resin binders are used in this process, foundry sand is coated with the resin. The sand coated with resin is blown into a core box. Then a gaseous or vaporized ester, such as methyl formate, is passed through the coated sand to cure the resin. As noted above, this process is described in detail in U.S. Pat. No. 4,468,359 (Re. 32,720). This patent is incorporated herein by reference in its entirety.

Any refractory material commonly used to make foundry cores and molds can be used in the composition and process of this invention. Such refractory material includes silica sands, lake sands, bank sands, zircon sands, chromite sand, olivine sand and the like. Also, mixtures of these materials may be used.

The resin binders used in the process of this invention are employed in the proportions normally used in foundry binder operations. These are generally between about 0.5 parts and about 8 parts by weight of the resin binder per 100 parts of the refractory material.

The phenolic resole resin binders used in the practice of this invention are prepared by methods well known in the art. In general, they are prepared by reacting a molar excess of an aldehyde with a phenol under alkaline conditions. Various phenols may be used in the preparation of the resin, the preferred phenolic material is unsubstituted phenol. Likewise, any of the commonly used aldehydes may be used in the preparation of the resin. The preferred aldehyde is formaldehyde.

Any of the commonly used basic catalysts may be used to prepare the phenolic resole resin. However, the preferred alkali in the product is KOH. For this reason, this alkali may be used in the manufacture of the resin, or may be added to the resin subsequent to its preparation. The alkalinity of the resin is expressed in terms of the molar ratio of KOH to the phenol in the resin. However, other alkalis are not excluded and may be used alone or in combination with KOH.

The molar ratio of KOH:phenol in the resin solution is in the range of from about 0.2:1 to about 1.2:1. The preferred molar range of KOH:phenol is from about 0.4:1 to about 0.9:1.

The molar ratio of aldehyde:phenol is from about 1.2:1 to about 2.6:1. The preferred molar range of aldehyde:phenol is from about 1.5:1 to about 2.2:1.

The binder used in this invention is an aqueous solution of the alkaline phenolic resole resin. The solids content of the aqueous solution is in the range of from about 40 percent to about 75 percent by weight.

The moldability of sand coated with the binder is increased by means of a flow promoter. Compounds suitable for use as flow promoters in the process and compositions of the present invention are fatty acids, fatty alcohols, fatty amines, fatty amides and fatty alkanolamides. The term "fatty" is used herein to designate compounds containing a hydrocarbon radical with from about 10 to about 20 carbon atoms. These compounds can be represented by the general structural formula: A-Y where A is a hydrocarbon radical containing from about 10 to about 20 carbon atoms and Y is selected from the group consisting of —OH, —COOH, —OZ, —NR$_2$, and —CONR$_2$ where the Rs are the same or different and denote H, alkyl groups containing from 1 to 3 carbon atoms, or Z, where Z denotes —(CHX—CHX—O)$_n$H wherein X denotes H or CH$_3$ and n is a whole number from 1 to 5.

The fatty acids suitable for use in the practice of this invention include both saturated and unsaturated fatty acids such as stearic acid, oleic acid, linoleic acid, and linolenic acid. Also suitable for use in the practice of this invention are mixtures of acids such as the commercially available red oil which is a mixture of stearic, oleic and linoleic acids. Amides and alkanolamides of the fatty acids are likewise useful in the processes and compositions of this invention.

Alcohols suitable for use in the practice of this invention may contain either a saturated hydrocarbon radical such as stearyl alcohol, or an unsaturated hydrocarbon radical such as oleyl alcohol. Commercial alcohols which contain mixtures of various hydrocarbon radicals may also be used. An example of such a commercial mixture of fatty alcohols is available from the Proctor and Gamble Company, Cincinnati, Ohio under the trade name Fatty Alcohols CO-1214. This is a mixture of fatty alcohols containing from 10 to 16 carbon atoms. Also suitable are derivatives of the alcohols which have been formed by the reaction of the alcohols with from 1 to 5 moles of ethylene oxide or propylene oxide.

Similarly, the fatty amines suitable for use in the process of this invention may be saturated or unsaturated fatty amines and the amines may be primary, secondary or tertiary amines. Secondary and tertiary amines suitable for use in the practice of this invention contain one long chain hydrocarbon radical having from 10 to 20 carbon atoms while the other hydrocarbon radicals attached to the nitrogen contain from 1 to 3 carbon atoms. Commercial mixtures of fatty amines such as the KEMAMINES available from the Witco Chemical Corporation are suitable for use in this invention. They are described in Example VI. Also suitable are alkanol derivatives of the primary or secondary amines such as those formed by the reaction of the amines with ethylene oxide o propylene oxide.

In the practice of this invention, the amount of flow promoter used is an amount which is effective to increase the moldability of the resin coated sand. The amount of flow promoter is preferably from about 0.01 percent to about 5 percent, more preferably from about 0.1 percent to about 2 percent by weight of the resin binder. This flow promoter may be mixed with the resin before it is coated on the sand. Alternatively, the flow promoter may be added separately before, during or after the coating of the sand with the resin.

The flow promoter is employed as a liquid. Preferred promoters are liquids under use conditions. However, if the promoter is not a liquid, a suitable solvent may be added to dissolve the promoter before it is mixed with the resin or sand.

When the binders of this invention are used for the production of foundry cores and molds, the refractory material such as foundry sand is mixed thoroughly with the aqueous alkaline binder solution. Mixing is carried out until substantially all of the sand particles are coated completely and uniformly with the binder solution. The refractory material coated with the binder is then placed in a vented core or mold box, such as is used in conventional "cold-box" processes.

The mixture of sand and resin is hardened by passing a volatile ester through the material in the vented box. The preferred esters used for gassing the mixture are the lower alkyl formates. The most preferred ester is methyl formate. As is known in the art, such esters are not usually used as a pure gas, but as a vapor or aerosol in an inert carrier gas. Such inert carrier gases are those which do not react with the ester or have an adverse affect on the curing reaction or the properties of the product. Suitable gases include air, nitrogen or argon.

It is often the practice in the foundry art to include a variety of additives in the resins used to prepare foundry cores and molds. These additives include such materials as silanes, deodorizing agents, urea, and the like. Such additives may be used in the present process and to not interfere with the improved flowability of the resin coated sands.

The following examples illustrate the invention. It is to be understood that the examples are illustrative only and do not intend to limit the invention in any way. In the examples, all parts and percentages are by weight, unless otherwise indicated.

EXAMPLE I

WEDRON 530 sand was coated with an alkaline phenolic resole resin mixed with various amounts of a commercial mixture of fatty alcohols having from 10 to 16 carbon atoms per molecule. The amount of resin used was 1.75 percent by weight of the sand. The alkaline phenolic resole resin used was a commercial resin, BETASET 9511, available from the Acme Resin Corporation, Westchester, Illinois. The commercial fatty alcohol was CO-1214 manufactured by the Proctor and Gamble Company, Cincinnati, Ohio. A comparative test was made using sand coated with the resin without the addition of any flow promoter.

Flowability of the resin coated sands was measured three minutes after resin was added to the sand by the moldability test given in the AFS Mold and Core Test Handbook. In this procedure, 300 g of the resin coated sand was placed in a Dietert lab moldability and work life tester equipped with an 8-mesh cylindrical screen.

The sand mix was riddled through the screen for ten seconds. Moldability index was calculated as the percentage of sand which passed through the screen. Results of the tests given in Table I show that the sand coated with resin containing from 0.13 to 2 percent fatty alcohols based on the weight of the resin had a much higher moldability index and consequently much greater flowability than sand coated with the resin only.

TABLE I

Moldability of Sand Coated with
BETASET 9511 and Fatty Alcohols

| Fatty Alcohol (Weight %)[1] | Moldability Index |
|---|---|
| None (Comparative Test) | 71.5 |
| 0.13 | 81.2 |
| 0.25 | 85.8 |
| 0.50 | 88.3 |
| 1.0 | 89.2 |
| 2.0 | 88.8 |

[1] Based on weight of resin

EXAMPLE II

The general procedure of Example I was followed except that the resin alone was first mixed with the sand. After 135 seconds of mixing, 1 percent of the fatty alcohol based on the weight of resin was added to the sand. The flowability was determined after an additional 45 seconds of mixing. The resulting moldability index was 87.7 percent as compared with 71.5 percent for the sand coated with resin without the flow promoter.

EXAMPLE III

The procedure of Example II was followed except that the fatty alcohol was first added to the sand. After 30 seconds of mixing, the resin was added and mixing was continued for 3 minutes. Moldability of the coated sand was 88.8 percent as compared with 71.5 percent for the sand coated with resin only.

Examples II and III show that the flowability of the resin coated sand is improved when the flow promoter is added to the sand before or after the resin is mixed with the sand. This improvement is comparable to that obtained when the flow promoter and resin are mixed before coating on the sand as in Example I.

EXAMPLE IV

The general procedure of Example II was followed except that varying amounts of oleic acid were added to the mixture of sand and resin. The results given in Table II show that the fatty acid is also an effective flow promoter for sand coated with the alkaline phenolic resole resin.

TABLE II

MOLDABILITY OF SAND COATED WITH
BETASET 9511 AND OLEIC ACID

| Oleic Acid (Weight %)[1] | Moldability Index |
|---|---|
| None (Comparative Test) | 74.0 |
| 0.25 | 82.9 |
| 0.63 | 91.7 |
| 1.0 | 88.4 |
| 2.0 | 86.7 |

[1] Based on weight of resin

EXAMPLE V

The general procedure of Example IV was followed except that red oil (a commercial grade of oleic acid containing about 15 percent each of linoleic and stearic acids) was added in an amount of 2 percent based on the weight of the resin. The moldability index was 87 percent compared with 71.5 percent for the sand coated with resin only. Similar improvements in flowability were observed when linolenic and linoleic acids were added to the resin coated sands.

EXAMPLE VI

The general procedure of Example II was followed using various fatty amines at a rate of 1 percent by weight of the resin. The amines used were the fatty dimethyltertiary amines KEMAMINE T-6502D and T-9992D, the primary cocoamines P-650D and, a mixture of oleyl and linoleyl primary amines KEMAMINE P-999. (All KEMAMINES are available from Witco Chemical Corp., New York City). The results given in Table III demonstrate that the fatty amines are effective flow promoters for sands coated with alkaline phenolic resole resin binders.

TABLE III

MOLDABILITY OF SAND COATED WITH
BETASET 9511 AND FATTY AMINES

| Amine | Moldability Index |
|---|---|
| None (Comparative Test) | 74.2 |
| KEMAMINE T-6502D (Tertiary dimethyl fatty amine) | 81.7 |
| KEMAMINE T-9992D (Tertiary dimethyl fatty amine) | 83.1 |
| KEMAMINE P-999 (Primary oleyl and linoleyl amines) | 87.5 |
| KEMAMINE P-650D (Primary coco amine) | 87.5 |

EXAMPLE VII

A solution of 695 g of phenol in 131 g of water was stirred while 612 g of a 45 percent aqueous solution of KOH was added. The rate of addition and the amount of cooling were adjusted so that the temperature of the reaction mixture did not exceed 70° C. Then 740 g of a 50 percent aqueous solution of formaldehyde was added slowly with cooling to maintain a temperature of 80° C. The mixture was then held at 80° C. for about six hours until the viscosity was 140–150 cps (centipoises) measured at 25° C. The mixture was cooled to 25° C. and 7.5 g of gamma-aminopropyltriethoxysilane was added slowly. The resulting alkaline phenolic resole resin product had a pH of 12.1, a viscosity at 25° C. of 161 cps and a refractive index of 1.4920.

The resin and then 1 percent by weight of the fatty alcohol CO-1214 were coated on sand as in Example II. Flowability of the coated sand was measured using the procedure of Example I. Similar tests were performed using a mixture of the resin with 1 percent oleic acid and with 1 percent KEMAMINE P-999 (described in Example VI). A comparative test was made using sand coated with resin which contained no flow promoters. The results given in Table IV demonstrate the effectiveness of the flow promoters of this invention.

TABLE IV

MOLDABILITY OF SAND COATED WITH AN ALKALINE
PHENOLIC RESOLE RESIN AND
VARIOUS FLOW PROMOTERS

| Flow Promoter | Moldability Index |
|---|---|
| None (Comparative Test) | 69% |
| Fatty Alcohol | 77% |

TABLE IV-continued

MOLDABILITY OF SAND COATED WITH AN ALKALINE PHENOLIC RESOLE RESIN AND VARIOUS FLOW PROMOTERS

| Flow Promoter | Moldability Index |
| --- | --- |
| (CO-1214) Fatty Amine (KENAMINE P-999) | 81% |
| Oleic Acid | 81.5% |

EXAMPLE VIII

An alkaline phenolic resole resin solution was prepared as described in Example VII. Then WEDRON 530 sand was coated with the resin solution. The amount of resin was 1.75 percent by weight of the sand. After 135 seconds of mixing, 1 percent of various flow promoters based on the weight of the resin were added to the resin coated sand and the mixture was stirred for an additional 45 seconds. The flowabilities of the various coated sands containing these flow promoters were measured using the procedure described in Example I. Flowability of resin coated sand containing no flow promoter was measured for comparison purposes. The results given in Table V show that fatty amides and fatty alkanolamides as well as fatty acids improve the flowability of sands coated with an alkaline phenolic resole resin.

TABLE V

MOLDABILITY OF SAND COATED WITH AN ALKALINE PHENOLIC RESOLE RESIN AND VARIOUS FLOW PROMOTERS

| Flow Promoter | Moldability Index |
| --- | --- |
| None (Comparative Test) | 69.0% |
| Oleic Acid | 85.0% |
| N,N-Dimethyloleamide | 78.3% |
| Fatty Alkanolamide (NINOL 1285)[1] | 87.2% |

[1] A fatty alkanolamide available from the Stepan Company, Northfield, Illinois, containing about 20% free amine and 20% free fatty acid.

Thus, it is apparent that there has been provided, in accordance with this invention, a method for improving the flowability of resin coated sand that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to include all such alternatives, modifications and variations as set forth within the spirit and broad scope of the appended claims.

What is claimed is:

1. A process for improving the flowability of sand coated with an alkaline phenolic resole resin binder curable by a volatile ester in a "cold box" process which comprises incorporating in the mixture of sand and resin binder an amount of flow promoter effective to improve the flowability of the mixture wherein said flow promoter comprises one or more compounds having the structural formula: A-Y where A is a hydrocarbon radical containing from about 10 to about 20 carbon atoms and Y is selected from the group consisting of —OH, —COOH, —OZ, —NR$_2$ and —CONR$_2$ where the Rs are the same or different and denote H, alkyl groups containing from 1 to 3 carbon atoms, or Z, where Z denotes —(CHX—CHX—O)$_n$H wherein X denotes H or CH$_3$ and n is a whole number from 1 to 5.

2. The process of claim 1, wherein the amount of flow promoter is from about 0.01 percent to about 5 percent by weight of the resin binder.

3. The process of claim 2, wherein the amount of flow promoter is from about 0.1 percent to about 2 percent by weight of the resin binder.

4. The process of claim 1, wherein the flow promoter is added to the resin binder before it is coated on the sand.

5. The process of claim 1, wherein the flow promoter and resin binder are added separately to the sand.

6. A foundry mix for preparing foundry cores and molds which comprises a foundry sand, from about 0.5 percent to about 8 percent by weight of the sand of an alkaline phenolic resole resin binder curable by a volatile ester in a "cold-box" process and an amount of a flow promoter effective to improve the flowability of the mix wherein said flow promoter comprises one or more compounds having the structural formula: A-Y where A is a hydrocarbon radical containing from about 10 to about 20 carbon atoms and Y is selected from the group consisting of —OH, —COOH, —OZ, —NR$_2$ and —CONR$_2$ where the Rs are the same or different and denote H, alkyl groups containing from 1 to 3 carbon atoms, or Z, where Z denotes —(CHX—CHX—O)$_n$H wherein X denotes H or CH$_3$ and n is a whole number from 1 to 5.

7. The foundry mix of claim 6, wherein the amount of flow promoter is from about 0.01 percent to about 5 percent by weight of the resin binder.

8. The foundry mix of claim 7, wherein the amount of flow promoter is from about 0.1 percent to about 2 percent by weight of the resin binder.

9. A process for the production of foundry cores and molds which comprises:
   (a) preparing a foundry mix of claim 6;
   (b) placing the foundry mix in a vented core or mold box; and
   (c) gassing the mix in the core or mold box with a volatile ester.

10. The process of claim 9, wherein the foundry sand used to prepare the foundry mix is selected from the group consisting of silica sand, chromite sand, zircon sand, olivine sand and mixtures thereof.

11. The process of claim 10, wherein the aqueous alkaline solution of a phenolic resole resin binder used to prepare the foundry mix is present in an amount of about 1 percent to about 3 percent by weight of the sand.

12. The process of claim 11, wherein the flow promoter used to improve the flowability of the mix comprises from about 0.01 percent to about 5 percent by weight of the binder.

13. The process of claim 12, wherein the flow promoter comprises from about 0.1 percent to about 2 percent by weight of the binder.

14. A foundry core or mold prepared by the process of claim 9.

* * * * *